United States Patent [19]

Bell et al.

[11] Patent Number: 4,598,855

[45] Date of Patent: Jul. 8, 1986

[54] ONE-HANDED SOLDERING GUN

[76] Inventors: Richard S. Bell, 1310 Grayrock Dr., Marietta, Ga. 30066; Charles T. Hood, Jr., 4038 Carter Dr., Lilburn, Ga. 30247

[21] Appl. No.: 406,770

[22] Filed: Aug. 10, 1982

[51] Int. Cl.⁴ ............................ B23K 3/02; B23K 3/06
[52] U.S. Cl. ...................................... 228/52; 219/230
[58] Field of Search ............................ 228/51, 52, 53; 219/230

[56] References Cited

U.S. PATENT DOCUMENTS

| | | | |
|---|---|---|---|
| 1,631,063 | 5/1927 | Rognley | 228/52 |
| 3,531,038 | 9/1970 | Dezzani | 228/52 |

FOREIGN PATENT DOCUMENTS

| | | | |
|---|---|---|---|
| 2232601 | 1/1974 | Fed. Rep. of Germany | 219/230 |
| 643891 | 7/1928 | France | 228/52 |

Primary Examiner—Nicholas P. Godici
Assistant Examiner—Marc Hodak

[57] ABSTRACT

A one-handed soldering apparatus comprises a solder dispensing unit and a solder melting unit mounted in a cooperating manner to provide for one-handed dispensing and melting of solder from a single combination device. A unique solder discharging device provides for the controllable flow of a solder paste which flow is begun and halted upon command with a minimum of unwanted oozing of excess paste.

6 Claims, 5 Drawing Figures

ONE-HANDED SOLDERING GUN

FIELD OF THE INVENTION

The present invention relates generally to the field of soldering and includes components relative to the field of fluid dispensers.

BACKGROUND OF THE INVENTION

Anyone who has tried to solder together two small elements such as two wire ends is familiar with the exasperating feeling of "I wish I had three hands". One hand is needed to hold the wire elements in contact with one another (sometimes this requires two hands). A second hand is needed to hold the solder adjacent the wire elements and a third hand is needed to operate the soldering iron to melt the solder. Unfortunately, not all of us have this third (or sometimes fourth) hand. In an effort to make soldering at least somewhat less of a challenge, soldering pastes have been developed which allow a user to apply a solder paste to the wire element. The paste adheres to the wire in order that the user need not hold the solder in place while melting the solder. Use of the paste still requires "three hands" but not simultaneously; for example one hand holds the wire elements, the second hand applies the solder paste from a dispenser of some kind, then places the dispenser aside and (the third hand) picks up the soldering iron and melts the solder. An example of such a soldering paste is that paste sold by Bell Ensign Alloys and Research Co. under the trademark "Silver Weld". Although the soldering paste has uncomplicated matters greatly, numerous difficulties still remain. The user is faced with the problems of fumbling with the solder dispensing device or can with one hand, since the other hand is still holding the wire elements in place. Also, it is difficult, using the solder paste dispensers presently known in the art, to apply a small amount of solder to the wire elements. Usually there is an overflow of solder which must be wiped away in order to prevent the solder weld from being too large. This is especially important in the soldering of electronic components such as circuit boards. Furthermore, it is time consuming to apply solder with one hand, clean the solder if necessary, put the solder aside and pick up a soldering iron to melt the solder.

In general, prior to the present invention, difficulties such as those mentioned above, together with other aggravations, make soldering a relatively slow and tedious process.

SUMMARY OF THE INVENTION

Briefly described, the present invention comprises a one-handed soldering apparatus comprising a solder dispensing unit and a solder melting unit mounted in a cooperating manner to provide for the one-handed dispensing and melting of solder from a single combination device. The solder apparatus comprises a body unit to which are mounted the dispensing unit and the melting unit. The dispensing unit comprises a manually operated solder discharging system which, through the action of a thumb or finger of the user, discharges solder paste which is held therein, in controlled amounts. The device provides for the discharge of a desired amount of solder at a chosen location in close proximity to the heating tip of the soldering iron. The discharged solder is melted by the iron of the soldering apparatus with the user never needing to remove his eyes from the soldering point or his hand from the soldering gun. The dispensing unit comprises mechanism which allows the user to discharge the soldering paste in controlled quantities so as to provide dots, lines, and other designs and quantities of solder and to stop the flow of solder paste upon command without an undesired oozing or drooling of excess solder.

Therefore, it is an object of the present invention to provide a one-handed soldering apparatus with which a user can both dispense and melt solder using one hand, keeping his second hand free for manipulation of the elements to be soldered.

Another object of the present invention is to provide a paste dispensing apparatus from which paste can be dispensed in controlled quantities with the flow of paste being both begun and halted upon command with a minimum of unwanted oozing of excess paste.

Yet another object of the present invention is to provide a light weight, easy to operate soldering apparatus which can be used to quickly and accurately apply and melt solder.

Other objects, features and advantages of the present invention will become apparent upon reading and understanding the present specification, when taken in conjunction with the accompanying drawings.

DETAILED DESCRIPTION OF THE PREFERRED EMBODIMENT

Figure 1:
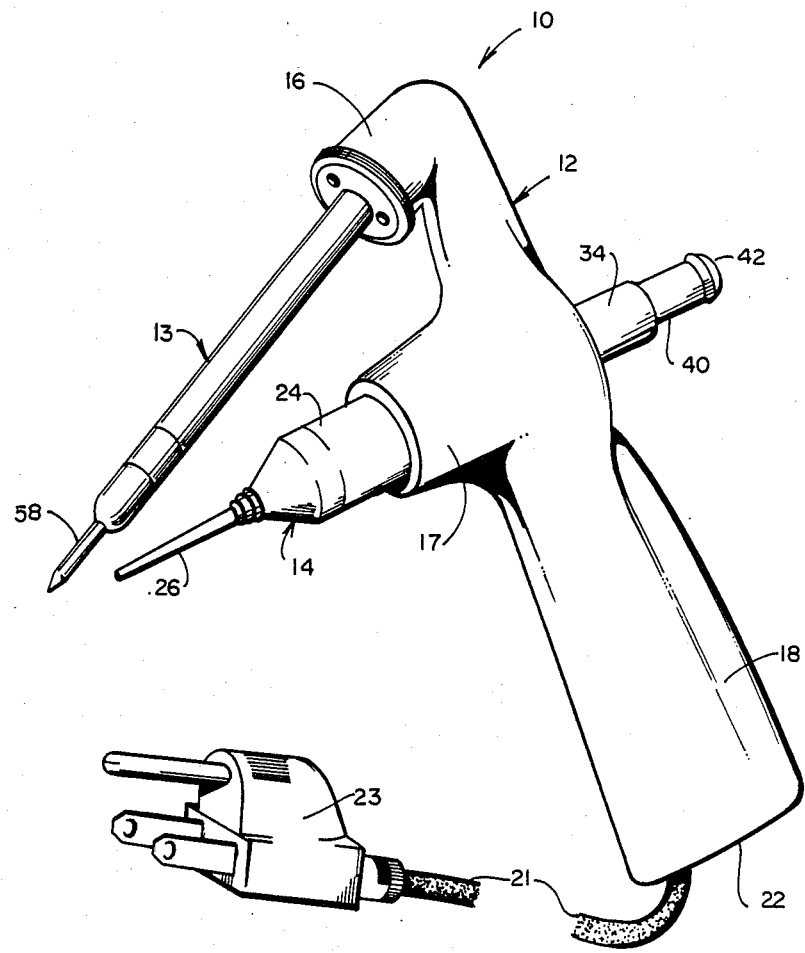
FIG. 1 is a pictorial view of the one-handed soldering apparatus in accordance with the present invention.

Referring now in greater detail to the drawings in which like numerals represent like components throughout several views, FIG. 1 shows the one-handed soldering apparatus 10 of the present invention. The soldering apparatus 10 comprises a body unit 12 to which are mounted a soldering iron 13 and a soldering paste dispensing cartridge 14. The soldering iron 13 is mounted in a fixed relationship to the body unit 12 at what will be termed the head portion 16 of the body unit. The dispensing cartridge 14 is supported by the body unit 12 and extends through a cartridge channel 19 (see FIG. 3) which channel is formed through the body unit at what will be termed the mid-portion 17 of the body unit. The paste dispensing cartridge 14, in the preferred embodiment, is movable relative to the body unit 12 through the cartridge channel 19 from a retracted, non-discharge position shown in solid lines in FIG. 1 to a forward most, discharge position indicated by dotted lines in FIG. 1. The body unit 12 also defines a handle portion 18 to the opposite side of the mid-portion 17 from the head portion 16. An electrical cord 21 which provides electricity to the soldering iron 13 enters the body unit 12 at the butt 22 of the handle portion 18. A plug 23 is connected at the free end of the electrical cord 21.

Figure 2:
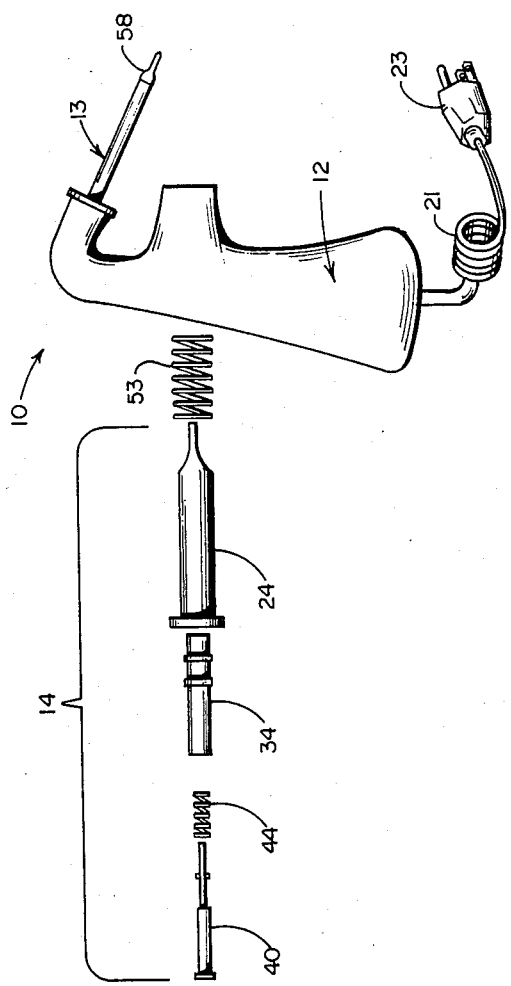
FIG. 2 is an exploded, side view of the one-handed soldering apparatus of FIG. 1.
Figure 3:
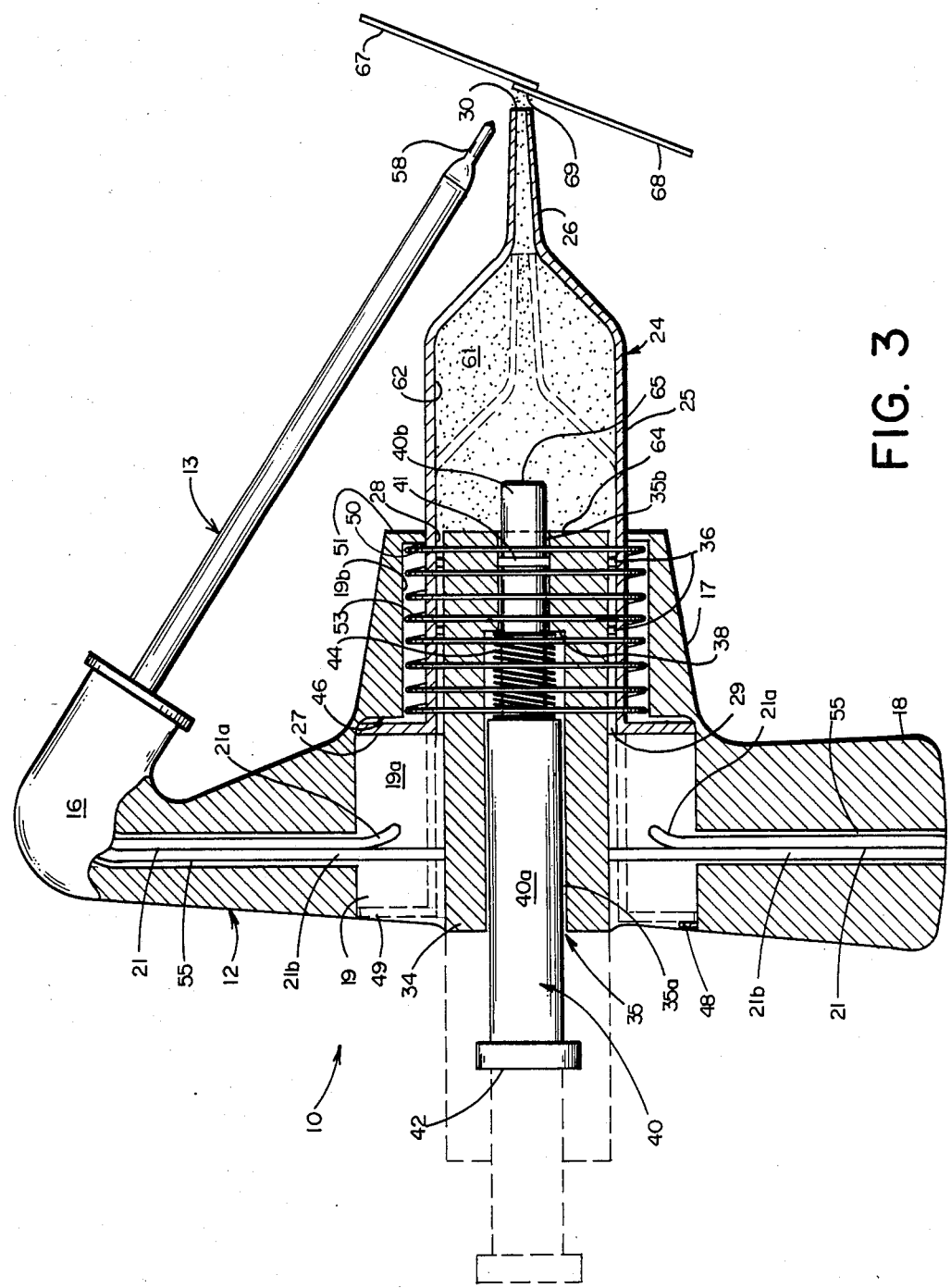
FIG. 3 is a broken, cross-sectional view of the one-handed soldering apparatus of FIG. 1.

As seen in FIGS. 2 and 3, the paste dispensing cartridge 14 of the preferred embodiment comprises an outer shell 24 which shell, in the preferred embodiment, is generally in the shape of a syringe. The shell 24 (syringe 24) comprises a generally cylindrical casement 25 and an elongated nozzle 26 formed at one end of the casement. A flange 27 is formed protruding generally perpendicular from the casement 25 at an end of the casement opposite the nozzle 26 and girding the casement. The syringe 24 defines a hollow inner compartment 28 extending throughout the length of the syringe. At the flange end of the syringe, is defined a wide entrance port 29 leading into the compartment 28 and at the nozzle end of the syringe is a narrow exit port 30 leading from the hollow inner compartment. A plunger 34 is removably inserted into the syringe inner compartment 28 through the entrance port 29. The plunger 34 is generally cylindrical in shape and is bored along its cylindrical axis to define a passageway 35 extending through the length of the plunger. The passageway 35 is comprised of two sections, a rear passageway 35a and a front passageway 35b. The front and rear passageways 35a, 35b are concentric but the diameter of the front passageway 35b is smaller than the diameter of the rear passageway 35a. An annular abuttment 38 is formed at the transition from the rear passageway 35a to the front passageway 35b. The plunger 34 is formed with two annular seals 36.

A pushrod 40 is removably inserted into the passageway 35 of the plunger 34. The pushrod 40 is generally cylindrical in shape and is comprised of two portions, a rear rod 40a and a front rod 40b. The front rod 40b is of diameter slightly less than the diameter of the front passageway of the plunger 34. The rear rod 40a is of a diameter larger than the diameter of the front passageway 35b yet smaller than the diameter of the rear passageway 35a of the plunger 34. An annular seal 41 is formed about the front rod portion 40b of the pushrod 40. A knob 42 is defined at the free end of the rear pushrod 40a. A rod return spring 44 encircles the front rod portion 40b and the spring 44 has an effective diameter greater than the plunger front passageway 35b and less than the plunger rear passageway 35a.

As seen in the cutaway view of FIG. 3, the cartridge channel 19 of the body unit 12 extends through the body unit 12. The channel comprises two portions, a rear channel 19a and a front channel 19b. In the preferred embodiment, the front channel 19b defines a cylindrical bore of slightly larger diameter than the syringe casement 25. The rear channel 19a comprises a cylindrical bore, concentric with the front channel 19b, but has a larger diameter than the front channel. The rear channel 19a, in the preferred embodiment, is of a size and shape sufficient to accept the syringe flange 27. An annular stop 46 is formed at the transition from the rear channel 19a to the front channel 19b. A small tab 48 is located at the rear opening 49 of the channel 19. The front opening 50 of the channel 19 is rimmed by an inwardly protruding lip 51. In its assembled form, a cylinder return spring 53 encircles the syringe casement 25.

A corridor 55 is formed through the body unit 12 from the butt 22 to the head portion 16. The two wire electrical cord 21 is threaded along the corridor to connection with the soldering iron at the head portion 16. The two wires 21a, 21b of the cord 21 are separated at the cartridge channel 19 and threaded along opposite sides of the rear channel 19a in such a manner as to avoid interference with the movement through the channel of the syringe annular flange 27. The soldering iron 13 which is fixed to the head portion 16 of the body unit 12 is of a type known in the art for producing sufficient heat at the tip 58 of the iron to melt solder.

The inner compartment 28 of the syringe 24 is occupied by both a solder paste 61 and at least a portion of the plunger 34/pushrod 40 assembly. That portion of the compartment 28 which is available to be occupied by solder paste 61 shall be termed the paste chamber 62. The paste chamber 62 is defined generally by the syringe casement 25 and the front most ends 64, 65 of the plunger 34 and pushrod 40, respectively. The plunger end 64 and pushrod end 65 together form a movable paste chamber wall. As the plunger 34 and pushrod 40 move within the syringe compartment 28, the paste chamber 62 varies in length and volume.

Operation. The one-handed soldering apparatus 10 in accordance with the preferred embodiment of the present invention is operated by a user as outlined below. A syringe 24 is loaded with a quantity of solder paste 61, occupying perhaps one half or two thirds of the inner compartment 28. The plunger 34 is inserted into the entrance port 29 of the syringe with the front end 64 adjacent the paste 61. The rod return spring 44 is placed over the front rod portion 40b of the pushrod 40. Pushrod 40 is then inserted through the plunger passageway 35 with the front end 65 leading through the passageway. The syringe 24 is inserted through the cartridge return spring 53 and then the syringe, bearing the cartridge return spring 53, is inserted into and through the cartridge channel 19 of the body unit 12 from the rear opening 49, with the syringe nozzle 26 leading the way.

In the preferred embodiment, the tab 48 at the rear opening 49 of the channel 19 is a flexible tab which will bend under pressure to allow the flange 27 to pass into the cartridge channel. The tab 48 will not permit the flange 27, and thus the syringe 24 to come back out of the channel 19 through the rear opening 49, unless sufficient force is exerted to temporarily bend the tab 48. Thus, the syringe is "trapped" within the body unit 12. In an alternate embodiment of the present invention, the tab 48 is ridged, and is indeed replaced by an annular lip which permanently prevents withdrawal of the syringe through the rear channel opening 49. In order to prevent the cartridge 14 from spinning about its cylindrical axis within the cartridge channel 19, the syringe flange 27 is made slightly oblong, or non-circular, and the rear channel 19a is formed with a cross section which matches the oblong shape of the flange.

It can be seen that the paste dispensing cartridge 14 has limited freedom of movement restricted by the length (left to right in FIG. 3) of rear cartridge channel 19a. The tab 48 serves as a rear most stop and the annular stop 46 serves as the forward most limiter of the syringe movement. The cartridge return spring 53 is blocked within the cartridge channel 19 at one end by the annular lip 51 and at its other end by the syringe flange 27. Elastic action of the spring 53 biases the syringe to its rear most position against the tab 48. This rear most or retracted position is shown in dotted lines in FIG. 3 (solid lines in FIG. 1). Rod return spring 44 is maintained between the annular abuttment 38 of the plunger 34 and the rear pushrod portion 40a of pushrod 40. The elastic nature of return spring 44 biases the pushrod to a rearmost or retracted position as indicated in dotted lines of FIG. 3 where the end 65 of pushrod 40 is flush with the end 64 of plunger 34. The retracted position of the syringe 24 and pushrod 40 (dotted lines of FIG. 3) shall be termed the non-discharge position.

For use of the present invention, in its preferred embodiment, in an actual soldering process, the user inserts a paste dispensing cartridge 14, which cartridge has been loaded with soldering paste 61, into the cartridge channel 19 of the body unit 12. The cartridge is inserted through the rear opening 49 and is snapped into place by pushing the syringe flange 27 past the flexible tab 48. By action of the cartridge return spring 53, the cartridge is normally maintained in the retracted, non-discharge position. To prepare for soldering, the plug 23 is plugged into an electrical outlet and the soldering iron is allowed to heat up until the tip 58 reaches a solder melting temperature. The user grips the body unit 12 with one hand encircling the handle portion 18. With the handle portion 18 gripped within the palm and fingers of the user's hand, the thumb of the same gripping hand is free to contact the knob 42 of pushrod 40, even with the syringe 24 and pushrod 40 in their fully retracted position. Once the soldering iron tip 58 has reached solder melting temperature, the user brings the soldering tip 58 into close proximity with the wires 67, 68 or other object to be soldered, and discharges solder paste at the desired soldering location 69. Using the preferred embodiment, the solder is discharged to the desired soldering location in very close proximity to the heated tip 58.

Solder paste discharge is accomplished in the following manner. The user pushes on the pushrod knob 42 with his thumb. The thumb force overcomes the force of cartridge return spring 53 thus moving the entire cartridge (syringe 24, plunger 34 and pushrod 40) forward until the syringe 24 reaches its forward most position when the flange 27 makes contact with the annular stop 46. Once the syringe 24 has reached its forward most position, continued pressure by the users thumb against knob 42 overcomes the force of rod return spring 44 to move the pushrod 40 through the plunger passageway 35 thus forcing the end wall 65 of the pushrod into the paste chamber 62. The end wall 65 continues to move into the paste chamber 62 until the rod return spring 44 is fully compressed. Movement of the pushrod end wall 65 into the paste chamber 62 decreases the volume of the paste chamber and displaces a certain amount of solder paste 61, forcing the solder paste from the exit port 30 of the nozzle 26, where the solder paste is applied to the wired junction 69. Solder paste 61 will continue to ooze from the nozzle exit port 30 as pressure is maintained on the pushrod knob 42. As necessary, additional pressure placed by the thumb on the pushrod 42, after the rod return spring 44 has been fully compressed, will move the plunger 34 further forward along the syringe inner compartment 28 thus decreasing the volume of paste chamber 62. In order to move the plunger 34 forward, sufficient force must be applied by the thumb to overcome the friction forces between the plunger seals 36 and the syringe casement 25 plus the force, if any applied by the solder paste 61 against the plunger end wall 64. To stop the flow and oozing of solder paste from the nozzle exit port 30, the user simply removes his thumb from the pushrod knob 42. Once the thumb is removed, the rod return spring 44 returns the pushrod 40 to its retracted position, withdrawing the pushrod end wall 65 from the paste chamber 62. Also, when the thumb force is removed, the cartridge return spring 53 returns the complete dispensing cartridge 14 to its retracted, non-discharge position against tab 48. The user then simply tips the body unit 12 with a slight movement of the wrist to bring the hot tip 58 of the soldering iron 13 into contact with the solder to melt the paste to complete bonding of the particular wire junction 69. The user then moves on to the next junction to repeat the above operation.

The force required to deflect (the "deflection force") the cartridge return spring 53 is less than the deflection force required for the rod return spring 44; and the deflection force required for rod return spring 44 is less than the friction force existing between the plunger seals 36 and syringe casement 25. In this way, force applied by the users thumb to pushrod knob 42 will first move the cartridge 14 forward to its forward most position (the discharge position) before the pushrod 40 moves forward to displace solder paste 61 from the nozzle exit port 30; and still additional force will be required to move the plunger 34 forward within the syringe inner compartment.

When the solder paste 61 within the paste chamber 62 has been totally exhausted, the entire soldering paste dispensing cartridge 14, of the preferred embodiment, is removed from the cartridge channel 19 by forcing the cartridge past the flexible tab 48 out the rear opening 49 of the channel 19. The dispensing cartridge 14 is then either refilled with paste as described above, or the entire dispensing cartridge is disposed of in favor of another, prefilled, disposable cartridge. In alternate embodiments of the present invention where the syringe 24 is not removable from the body unit 12, the paste chamber is refilled by withdrawing the plunger 34 from the rear entrance port 29 of the syringe, after which a quantity of solder paste 61 is loaded into the syringe through the entrance port 29 with the syringe still in the body unit. Then the plunger 34 and pushrod 40 are replaced into the syringe 24 as previously described.

Figure 4:
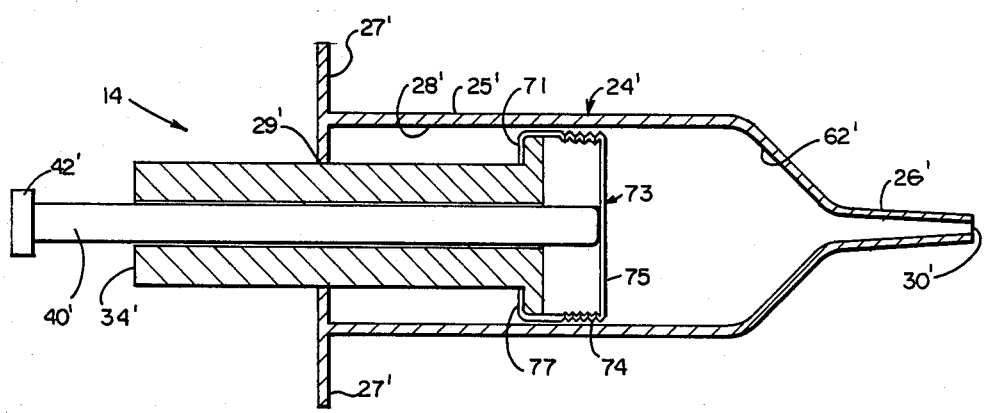
FIG. 4 is an isolated, cross-sectional view of a solder paste dispensing cartridge in accordance with the present invention, showing an alternative embodiment to that cartridge of FIGS. 1-3.

FIG. 4 shows an alternate embodiment of the soldering paste dispensing cartridge 14'. The entire alternate dispensing cartridge 14, seen in FIG. 4, simply replaces the entire paste dispensing cartridge 14 which is seen in FIGS. 2 and 3. That is, the cartridge return spring 53 encircles the syringe casement 25' of the dispensing cartridge 14'; after which the cartridge return spring 53 and dispensing cartridge 14' are inserted into the body unit 12 through the rear opening 49 of the cartridge channel 19. The dispensing cartridge 14' of FIG. 4 comprises a plunger 34' moveable through the inner compartment 28' of the syringe 24'. The plunger 34' includes a passageway 35' of uniform diameter bored through the central axis of the plunger. At the forward most end (right side of FIG. 4) of the plunger 34', an annular lip 71 is formed. Attached to the lip 71 of the plunger 34' is a generally cup shaped elastic boot 73. The boot 73 includes an overlapping boot portion 77 which overlaps the lip 71, an accordion-like cylindrical sidewall 74 and a flat, elastic end wall 75. A pushrod 40' is inserted through the plunger passageway 35'. In operation, the user exerts force on the pushrod knob 42' with his thumb to deflect the flat, elastic end wall 75 of the boot 73. This deflection of the end wall 75 causes protrusion of at least the center portions of the end wall into the paste chamber 62' thus lessening the volume of the paste chamber and displacing a certain amount of solder paste 61 from the nozzle exit port 30'. Continued force of the pushrod knob 42' will cause an extending of the accordian-like, elastic sidewall 74 to further assist in displacement of the solder paste. As increased force is applied to the pushrod knob 42', the force eventually overcomes the friction force at the seal formed by the plunger lip 71, overlapping boot portion 77 and syringe casement 25'. When the friction force is overcome, the plunger 34' is moved forward through the syringe compartment 28' thus decreasing the volume of the paste compartment 62'. To stop the flow, and oozing, of solder paste from the nozzle exit port 30', the user simply removes his thumb from the pushrod knob 42' and the elastic boot returns to its normal "contracted" state withdrawing the end wall 75 from the paste chamber 62'. The deflection force required to deflect the central portion of the elastic end wall 75 is less than the deflection force required to stretch the accordian sidewall 74, and each of those deflection forces is less than the friction force developed by the seal at the plunger lip 71. The deflection force required to deflect the central portion of the elastic end wall 75 is greater than the deflection force of the cartridge return spring 53 in order that when the dispensing cartridge 14' is supported within the cartridge channel 19 of the body unit 12, the initial force exerted on the pushrod knob 42' will compress the cartridge return spring 53 to place the cartridge 14 in its forward most, discharge position before any paste is discharged from the nozzle exit port 30'.

In still another embodiment of the present invention, in its broadest forms, the syringe 24 is permanently fixed, that is, there is no cartridge return spring 53 and no movement of the cartridge 14 from a non-discharge to a discharge position. Rather, the syringe is fixed in an appropriate position displaced far enough from the soldering iron tip 58 to avoid interference with the solder melting process. Preferably, this fixed syringe position is still so oriented as to allow for a simple wrist movement by the user to move the soldering apparatus 10 to discharge and apply paste to the wire junction 69 and then melt the solder with the solder tip 58. Although the syringe 24, in this discussed embodiment, does not move relative to the body unit 12, the discharging of solder paste 61 is accomplished in the same manner as discussed above.

Figure 5:
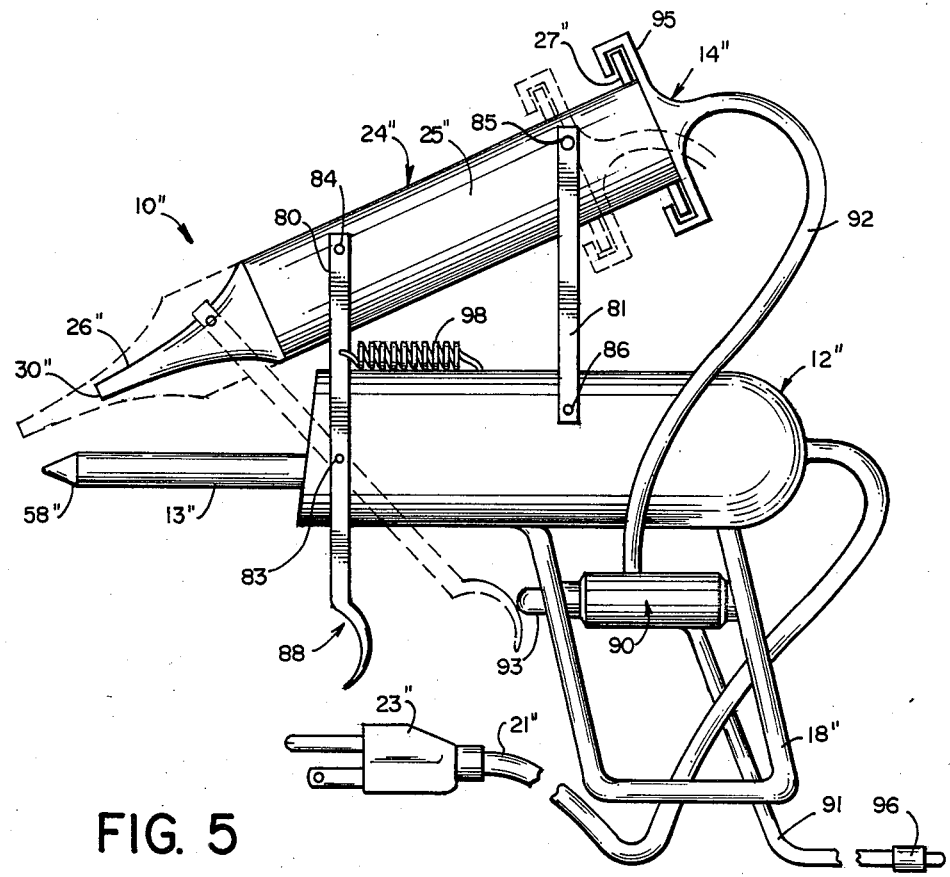
FIG. 5 is a side view of a one-handed soldering apparatus in accordance with the present invention, but showing an alternate embodiment to that of FIG. 1.

FIG. 5 shows another embodiment of the one-handed soldering apparatus 10 of the present invention. The soldering apparatus 10" of FIG. 5 comprises a body unit 12" to which are mounted a soldering iron 13" and a soldering paste dispensing cartridge 14". The soldering iron 13" is mounted in a fixed relationship to the body unit 12". The paste dispensing cartridge 14" is supported above the body unit 12" by linkages 80, 81. The linkages 80, 81 are pivotable about pins 83, 84, 85, 86 attached as shown to the body unit 12" or the dispensing cartridge 14" such that the cartridge can be pivoted into a lower, forward position (the discharge position) as shown by dotted lines in FIG. 5, and returned to the upper, non-discharge position as shown by solid lines in FIG. 5. The body unit 12" also defines a handle portion 18". Reaching below and comprising a rigid extension of the front linkage 80 is a trigger member 88. Mounted on the handle portion 18" is an air valve 90 to which is connected an air inlet tube 91 and an air outlet tube 92. The air valve 90 is of a type known in the art which prevents the passage of air from the inlet tube 91 to the outlet tube 92 until the valve is activated by depressing the valve button 93.

The paste dispensing cartridge 14" comprises a syringe shaped shell 24" comprising a generally cylindrical casement 25" and an elongated nozzle 26" formed at one end of the casement. A flange 27" is formed protruding from and generally perpendicular to the casement 25" at an end of the casement opposite the nozzle 26". The syringe 24" defines a hollow inner compartment (not seen) extending throughout the length of the syringe. At the flange end of the syringe, is defined a wide entrance port leading into the compartment and at the nozzle end of the syringe is a narrow exit port 30" leading from the hollow inner compartment. The air outlet tube attaches to the flange end of the syringe 24" with the aid of a removable adapter 95. At the free end of the air inlet tube 91 is an air tap for connection to a pneumatic air supply. An electrical cord 21" connects through the body unit 12" to the soldering iron 13" and has a plug 23" at its free end.

Operation of the apparatus in the embodiment of FIG. 5 is as discussed below. The adapter 95 is removed from the flange end of the syringe 24" and solder paste 61 is loaded into the syringe compartment. The adapter 95 is then replaced on the syringe, gripping the flange 27" to form an air-tight seal. The air tap 96 is connected to a supply of air which fills the air inlet tube 91 with compressed air. The air valve 90 prevents flow of air to the air outlet tube 92. The electrical cord 21" is plugged into an electrical outlet which begins heating of the soldering iron tip 58". The user grips the body unit 12" with one hand encircling the handle portion 18". With the handle portion 18" gripped within the palm and fingers of the user's hand, the index finger of the same gripping hand is free to contact the trigger member 88. Once the soldering iron tip 58 has reached solder melting temperature, the user brings the soldering tip 58" into close proximity with the wires or other objects to be soldered. The user then pulls in on the trigger member 88 with his finger which action pivots the linkages 80, 81 so as to move the dispensing cartridge 14" to the forward, discharge position (dotted lines of FIG. 5). As the dispensing cartridge reaches the discharge position, the trigger member is pivoted into contact with the valve button 93. As the user continues to pull on the trigger member 88, the valve button 93 is depressed by the trigger member, activating the air valve 90 and allowing air to flow through the air outlet tube 92 into the syringe compartment. The air pressure built up within the syringe compartment forces solder paste 61 from the nozzle exit port 30". The user can control the amount of paste being dispensed by varying the length of time during which the valve button 93 is depressed. This is done by the user simply letting out a little on the trigger member 88 with his index finger to remove the trigger member from contact with the button 93. When the valve button 93 is released, air pressure is removed from the syringe compartment and the flow or oozing of paste from the exit port 30" is halted. As the user releases the trigger member 88, the linkages 80, 81 and the dispensing cartridge 14" returns to its upper, non-discharge position by virtue of the action of return spring 98.

Whereas the present invention has been described in detail with particular reference to preferred embodiments thereof, it would be understood that variations and modifications can be effected within the spirit and scope of the invention as described hereinbefore and as defined in the appended claims.

We claim:
1. A soldering apparatus, comprising:
   a body unit;
   a solder paste dispensing unit supported by said body unit, said dispensing unit including a paste chamber defined by surrounding walls, at least a portion of said walls being a movable wall portion, said dispensing unit further including wall displacing means for selectively moving said movable wall portion to selectively vary the volume of said paste chamber; and solder melting means held by said body unit for melting solder dispensed by said dispensing unit, said solder melting means including a heating tip displaced from said body unit at a selected distance from said body unit, said solder dispensing unit comprising an exit port defined in a portion of said surrounding walls in communication between said paste chamber and the environment, and said dispensing unit being movable relative to the body unit to place said exit port alternately in discharge position in close proximity to said heating tip and in a non-discharge position at a distance removed from said heating tip relative to said discharge position, whereby said melting means and said dispensing unit cooperate to discharge, apply and melt solder.

2. A soldering apparatus, comprising:

a body unit;

a solder retention unit supported by said body unit, said solder retention unit comprising an inner compartment of fixed volume including a paste chamber of variable volume for retaining solder paste therein;

a solder exit port defined in said solder retention unit in communication between said paste chamber and the environment;

first movable wall means for varying the volume of said paste chamber within said inner compartment of said solder retention unit, comprising a first movable wall portion movable within said inner compartment and defining a boundary of said paste chamber and means for accepting force to move said first movable wall portion;

temporary discharge means for temporarily decreasing the volume of said paste chamber within said inner compartment of said retention unit, said temporary discharge means comprising a second movable wall portion movable within said inner compartment into and out of said paste chamber, elastic means for biasing said second movable wall portion to a position out of said paste chamber, and means for accepting force to overcome the bias of said elastic means and move said second movable wall portion into said paste chamber; and solder melting unit mounted to said body unit and comprising a heat tip displaced from said body unit.

3. Apparatus of claim 2, wherein said solder retention unit is movable relative to said body unit from a solder non-discharging position to a solder discharge position; and wherein said apparatus further comprises, second elastic means associated with said solder retention unit for biasing said retention unit to said non-discharge position, and means for accepting force to overcome the bias of said second elastic means and move said retention unit to said discharge position.

4. Apparatus of claim 1 or 3, wherein said body unit is hand holdable, whereby an adult user operates said apparatus with one hand to dispense, apply and melt solder.

5. A soldering apparatus, comprising:

a body unit;

a solder retention unit supported by said body unit, said solder retention unit comprising an inner compartment including a paste chamber, said solder retention unit being movable relative to said body unit from a solder non-discharge position to a solder discharge position;

a solder exit port defined in said solder retention unit in communication between said paste chamber and the environment;

solder paste held within said paste chamber;

paste discharging means for forcing paste from said paste chamber in controllable amounts through said exit port;

means for arresting the flow of paste from said paste chamber through said exit port; and solder melting means mounted to said body unit for melting solder discharged from said solder exit port.

6. Apparatus of claim 5, wherein said solder retention unit is movable relative to said body unit from a solder non-discharge position to a solder discharge position; and wherein said apparatus further comprises elastic means associated with said solder retention unit for biasing said retention unit to said non-discharge position, and means for accepting force to overcome the bias of said elastic means and move said retention unit to said discharge position.

* * * * *